United States Patent [19]

Watanabe et al.

[11] 4,071,448

[45] Jan. 31, 1978

[54] METHOD FOR TREATMENT OF CYANIDE-CONTAINING WASTE WATER

[75] Inventors: Hiroo Watanabe, Hujisawa; Kunihiko Toyoshima; Masaru Noutomi, both of Yokohama; Kouichi Yamakawa, Hujisawa, all of Japan

[73] Assignee: Mitsui Toatsu Chemicals, Incorporated, Tokyo, Japan

[21] Appl. No.: 636,657

[22] Filed: Dec. 1, 1975

Related U.S. Application Data

[63] Continuation-in-part of Ser. No. 394,802, Sept. 6, 1973, abandoned.

[30] Foreign Application Priority Data

| Sept. 18, 1972 | Japan | 47-92933 |
| Nov. 30, 1972 | Japan | 47-119364 |
| Jan. 29, 1973 | Japan | 48-11177 |

[51] Int. Cl.² ............................................. C02C 5/04
[52] U.S. Cl. ............................. 210/50; 210/63 R; 210/DIG. 31
[58] Field of Search .......... 210/50, 63 R, 59, DIG. 31

[56] References Cited

U.S. PATENT DOCUMENTS

| 2,690,425 | 9/1954 | Moses et al. | 210/63 R |
| 3,505,217 | 4/1970 | Morico | 210/59 |
| 3,729,413 | 4/1973 | Csuros et al. | 210/59 |
| 3,945,919 | 3/1976 | Schindewolf | 210/50 |

FOREIGN PATENT DOCUMENTS

| 86,153 | 11/1971 | Germany | 210/DIG. 31 |
| 46-27993 | 11/1966 | Japan | 210/DIG. 31 |

Primary Examiner—Thomas G. Wyse
Attorney, Agent, or Firm—Fisher, Christen & Sabol

[57] ABSTRACT

A method for treating a cyanide-containing waste water by mixing the waste water with a treating agent containing a carbonyl compound such as formaldehyde and subjecting said mixture to an elevated temperature in an atmosphere containing oxygen to evaporate water and volatile materials therefrom, decompose the cyanide-containing component thereof and burn the decomposed cyanide component and other combustible materials to provide exhaust gases of substantially reduced cyano component. Metals contained in the waste water in the form of noxious compounds are also converted into harmless forms and recovered and no toxic components are released into the atmosphere or discharged as waste. An apparatus useful in carrying out the method is also disclosed.

2 Claims, 4 Drawing Figures

U.S. Patent    Jan. 31, 1978    4,071,448
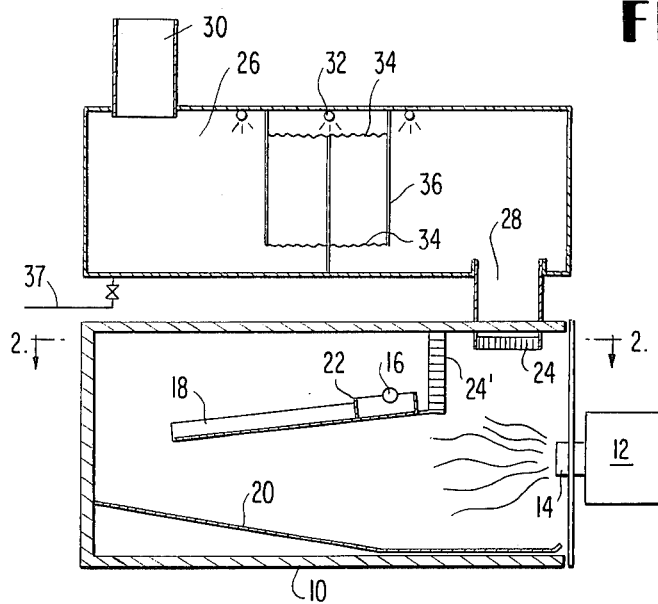
FIG.1
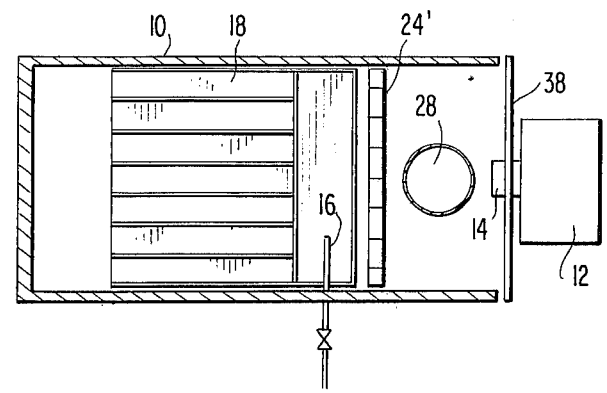
FIG.2
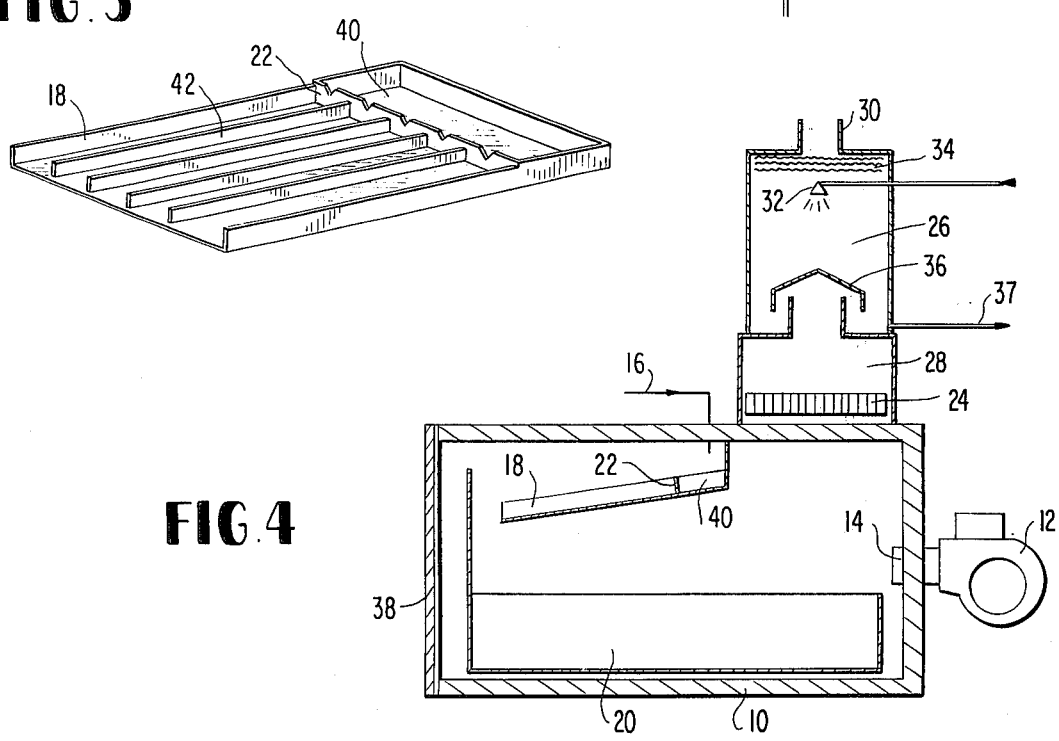
FIG.3
FIG.4

METHOD FOR TREATMENT OF CYANIDE-CONTAINING WASTE WATER

CROSS-REFERENCE TO RELATED APPLICATION

This application is a continuation-in-part of copending application Ser. No. 394,802 filed Sept. 6, 1973, now abandoned.

BACKGROUND OF THE INVENTION

1. Field of the Invention

This invention relates to a method for treatment of cyanide-containing waste water. More particularly, the present invention relates to treatment of waste water which is exhausted from chemical industries involving surface treatments of metals and metal refining, dyeing, etc.

2. Description of the Prior Art

In metal plating industries, waste waters containing dissolved cyanides of metals such as Zn, Cu, Ni, Fe, etc., are generally unavoidably produced in a dilute or condensed form. These cyanide-containing waste waters contain a cyano component in an extremely high concentration which in a condensed waste water amounts to as high as 30,000 – 50,000 ppm. Although these waste waters have considerably great toxicity, satisfactory methods for treating such waste waters in a technically and economically satisfactory manner have not been known in the art. This leaves the serious problem of environmental pollution unsolved.

As a matter of fact, a few methods have thus far been proposed and reduced to practice for rendering the condensed waste waters harmless in individual waste water-exhausting plants, including an oxidizing method using chlorine and an electrolytic oxidation method. However, these methods are disadvantageously complicated in treatment operations and have the possibility of generating toxic gases such as hydrogen cyanide, cyanogen chloride, etc. Additionally, the sludge resulting from these methods contains various kinds of metals but is discharged as it is since there have been no methods developed to treat the sludge in an effective manner.

On the other hand, it has been proposed to treat at one time waste waters collected from various plating and metal refining plants in a common treating system by acid decomposition, boiling and condensing or by ion-exchange. However, such methods disadvantageously give rise to various problems to be solved including generation of a large amount of hydrogen cyanide gas, formation of sludge which contains non-decomposed cyanides in an amount as high as several tens percent, and the necessity for safety measures for the apparatus which is used to carry out the particular method.

Moreover, there is also well known a method wherein cyanide-containing waste water is boiled down and condensed, or decomposed by the action of an acid to generate hydrogen cyanide which is charged in a subsequent stage into a burning furnace for combustion. However, it is essentially required in this method to treat the waste water in two distinct stages, i.e., complete decomposition of cyano components into hydrogen cyanide and separate combustion of the resultant cyanide, and to use a large-sized apparatus to conduct such two-stage treatment.

More recent methods directed to the treatment of cyanide-containing waste waters include the method disclosed in U.S. Pat. No. 3,215,524 wherein an aqueous formaldehyde solution is added to cyanide-containing waste water for liberating metals contained in the water, and then the metals are separated by adsorption using an ion-exchange resin, the method disclosed in U.S. Pat. No. 3,505,217 wherein cyanide-containing waste water is first mixed with an aldehyde or a mixture of formaldehyde bisulfite, and then further mixed with a mineral acid for decomposition, and the method disclosed in D.T. No. 2,119,119 wherein cyanides of metals which are contained in waste water are subjected to reaction with formaldehyde for recovering the metals in the form of alkali metal salts of glycolic acid. However, the solution which is obtained after decomposition and/or treatment with an ion-exchange resin for adsorbing and separating metals still disadvantageously has a high Chemical Oxygen Demand value and accordingly cannot be discharged from the treatment plant as it is. In addition, the metals contained in waste waters cannot be also advantageously collected in the form of useful compounds. Thus, these prior art methods cannot be adopted as a treating method of cyanide-containing waste water without entailing the disadvantages described above.

SUMMARY OF THE INVENTION

It is an object of the present invention to provide a method for treating cyanide-containing waste water which is produced in chemical plants as a result of surface treatments of metals and metal refining and converting the cyano components into harmless gases.

It is a further object of the present invention to provide a method for recovering metals contained in the cyanide-containing waste water in the form of a solid which is substantially free of cyanides or a cyano component and which can be easily handled.

It is a still further object of the present invention to provide a method for treating cyanide-containing waste water wherein cyano components therein are converted into harmless gases and metal components are collected, without allowing toxic components to be released into the atmosphere or discarded as waste.

It is another object of the present invention to provide a method for treating a cyanide-containing waste water wherein cyanides are rendered harmless without entailing problems of safety and complicated operations.

It has been found that the above objects can be attained by a method which comprises mixing the cyanide-containing waste water with a treating agent containing one or more carbonyl compounds such as formaldehyde and subjecting said mixture to treatment at a temperature of from 300° to 1200° C., e.g., with gas flames or other suitable heating means, in an atmosphere containing oxygen to evaporate water and volatile materials from the mixture and decompose the cyanide-containing components thereof and to burn the decomposed cyanide component and other combustible materials. According to this process the cyano components are converted into harmless gases whereby the cyano component contained in the exhaust gases which may be released to the atmosphere is substantially reduced. The metals contained in the original cyanide-containing waste water are recovered and may be collected in the form of harmless compounds such as ash or other solids and no toxic compounds are either released into the atmosphere or otherwise discarded as waste.

The above-described method can be practically carried out by means of an apparatus which comprises an incinerator comprising a burner provided on an inner wall surface thereof and having an injection means, nozzle, e.g., for injecting a combustion gas substantially horizontally into the incinerator, a waste water inlet positioned above the gas-injecting level of said burner, an upper plate positioned below said waste water inlet and above said gas-injecting level and inclined to allow the waste water to flow downward toward the gas-injecting level, and a lower plate positioned below the gas-injecting level and either inclined at an angle thereto to positively impart a downward flow to the waste water or held in a horizontal position without inclination, if desired, the lower plate being held in contact with the inner wall surfaces of the incinerator except for the wall surface on the side at which the burner is provided, and a dust collector for the combusted exhaust gases communicating with the incinerator through a flue positioned above the injection means in the burner.

It will be appreciated that by treating a cyanide-containing waste water by the method or by means of the apparatus of the present invention, it is possible to decompose 99% or more of the cyano components ($CN^-$) in the waste water into harmless gases, so that the content of the cyano component in the decomposed gases can easily be reduced to less than 1 ppm. Furthermore, the collected metals have a content of cyano component in an amount less than 10 ppm and are in the form of useful compounds or metals per se.

BRIEF DESCRIPTION OF THE DRAWING

The present invention will become apparent from the following detailed description taken in conjunction with the drawing in which:

FIG. 1 is a sectional view illustrating an apparatus employed for carrying out the method of the present invention;

FIG. 2 is a sectional view taken along line 2—2 of FIG. 1;

FIG. 3 is an enlarged fragmentary view of a portion of the apparatus of FIG. 1; and FIG. 4 is a sectional view showing another embodiment of the apparatus of the present invention.

DESCRIPTION OF THE PREFERRED EMBODIMENTS

In the present invention, cyanide-containing waste water is mixed with a treating agent which contains a carbonyl compound and the mixture is then burnt. The addition of the treating agent containing a carbonyl compound is particularly effective for accelerated decomposition and combustion of the cyanides contained in the waste water. In this connection, it should be noted that when a cyanide-containing waste water per se is subjected to combustion under the same conditions, it tends to yield a rock-like incineration residue which contains several thousands ppm. of cyano component.

When the combustion apparatus of the present invention is used for treating cyanide-containing waste water, combusting efficiencies will be remarkably improved with the mixture of the cyanide-containing waste water and a carbonyl compound. The cyano component content in the combusted exhaust gases obtained as a result of treatment in the combusting apparatus of the present invention is less than 1 ppm. as compared with about 10 ppm. by known apparatus.

Combustion temperatures of the present invention are within the range of 300°–1200° C., preferably 300°–800° C. The combustion temperature is finally determined depending upon the charged amounts of fuel, waste water and oxygen containing gas, e.g., air, and also is varied depending upon the particular structure and kind of heat resisting material of the incinerator, and atmospheric conditions such as external temperature and other weather conditions. In accordance with the method of the present invention, the combusting treatment of the waste water is carried out under the above-mentioned temperature conditions while charging oxygen-containing gas into the incinerator in a predetermined amount.

The waste water to be treated generally contains extremely toxic cyanides together with a relatively large amount of solid components which are dissolved or dispersed in a large amount of water. Accordingly, it is difficult to combust the waste water as such. Therefore, water and volatile matters are initially evaporated, and if the oxygen-containing gas such as air is charged in an excess amount, the burner flame becomes unstable and it becomes difficult to maintain a satisfactory burning state. Thereafter, the combustible materials contained in the waste water are burnt.

The burning of combustible materials requires a sufficient amount of air or other oxygen-containing gas so as not to produce a soot and this is in contrast to the initial evaporation with respect to the charge of air. That is, to achieve evaporation, air may be charged only in an amount sufficient to ensure combustion of the fuel, whereas to achieve combustion, a larger amount of air is required for combusting both the fuel and the combustible materials which are contained in the waste water.

For purposes of convenience and ease of control, the amount of oxygen contained in the oxygen-containing gas is determined by maintaining the oxygen content of the exhaust gases within a predetermined range. For the over-all process, the oxygen content in the exhaust gases is maintained within the range of 2.0–11.0% by volume by controlling the amount of air or other oxygen-containing gas charged into the system. When the oxygen content of the exhaust gases falls below 2% by volume, the combustible materials contained in the cyanide-containing waste water tend to burn incompletely and thus generate soot. On the other hand, when the oxygen content of the exhaust gases is greater than 11% by volume, the burner flame becomes unstable as described above and, in addition, it becomes difficult to maintain the combustion temperature within a predetermined range. Thus, during combustion of the decomposed cyanide component and other combustible materials, the oxygen content of the exhaust gases is preferably maintained within the range of 2.0–5.0% by volume. While the waste water may be treated by separate means to first evaporate water and volatile materials and decompose the cyanide-containing components and then to burn the decomposed cyanide components and other combustible materials, this requires a large-sized and complicated apparatus since the combustible materials must be retained in the treatment areas over a relatively long period of time. The process of the present invention, especially when conducted in the apparatus described herein, overcomes these disadvantages in a most efficient manner.

Generally, the process of the present invention is conducted at normal atmospheric pressure.

The treating agent which contains a carbonyl compound is preferably an aqueous formaldehyde solution or paraformaldehyde. Moreover, an aqueous solution or alkaline solution having paraformaldehyde dissolved therein, an addition compound of formaldehyde and sodium sulfite, hexamethylenetetramine and other formaldehyde-containing compounds or a compound which is capable of producing formaldehyde may also be employed.

Carbonyl compounds useful in the present invention include, for example, aldehydes such as acetaldehyde, propionaldehyde, butylaldehyde, isobutylaldehyde, benzaldehyde, o-, m- and p-nitrobenzaldehydes, o-, m- and p-chlorobenzaldehydes, o-, m- and p-methoxybenzaldehydes, o-, m- and p-hydroxybenzaldehydes, 4-, or 3-methyl-4-methoxybenzaldehyde, crotonaldehyde, furfural, metaldehyde, aldol, glyoxal, trioxane, tetraoxane, trimethylacetaldehyde, and the bisulfite addition products, halogenated alkylmagnesium addition products or halogenated allylmagnesium addition products of the above-mentioned aldehydes. Moreover, ketones and bisulfite addition products, halogenated alkylmagnesium or halogenated allylmagnesium addition products thereof may be employed. Examples of ketones include acetone, methyl ethyl ketone, n-propyl methyl ketone, isopropyl methyl ketone, n-butyl methyl ketone, tert-butyl methyl ketone, monochloroacetone, benzyl methyl ketone, $\beta$-phenyl ethyl ketone, $\beta$-phenyl propyl ketone, methyl phenyl ketone, ethyl phenyl ketone, n-propyl phenyl ketone, n-butyl phenyl ketone, n-amyl phenyl ketone, n-hexyl phenyl ketone, isopropyl phenyl ketone, isobutyl phenyl ketone, isoamyl phenyl ketone, isohexyl phenyl ketone, tert-butyl phenyl ketone, cyclohexyl methyl ketone, cyclobutanone, cyclopentanone, cyclohexanone, 2-, 3- or 4-methylcyclohexanone, cycloheptanone, cyclooctanone, cyclononanone, cyclohexadecanone, cyclotricontanone, menthone, acetophenone, actone oil, diethyl ketone, hexanone-2 or -3, di-n-propyl ketone, diisopropyl ketone, diisobutyl ketone, di-n-amyl ketone, chloroacetone, diacetyl, acetylacetone, sym-dichloroacetone, benzophenone, di-tert-butyl ketone, and diacetone alcohol. In addition, urea may be used as the carbonyl compound. Alternatively, saccharides such as monosaccharides which include aldoses and ketoses and polysaccharides may be used as the carbonyl compound. Examples of aldoses are glucose, galactose, glyceric aldehyde, allose, altrose, mannose, gulose, idose, talose, ribose, arabinose, xylose, lyxose, erythrose, threose, methylpentose, rhamnose, and fucose, and examples of ketoses are fructose and the like. Polysaccharides include sucrose, maltose, lactose, cellobiose, raffinose, stachyose, starch and dextrin. Moreover, glycoxide may also be used as the carbonyl compound.

These carbonyl compounds may be used singly or in combination, in the forms mentioned above or dissolved or dispersed in a solvent such as water for obtaining a treating agent. The treating agent may contain a stabilizer, an anticorrosive agent for preventing an incinerator from corrosion, and other substances useful in decomposing cyanides.

In accordance with the method of the present invention, the carbonyl compound or the carbonyl compound-containing agent is added prior to combustion to a cyanide-containing waste water with sufficient agitation, and the mixture is transferred to an incinerator for combustion. Alternatively, the treating agent may be uniformly mixed with the waste water immediately before the incineration while the latter is being continuously fed thereto. It should be noted that the mixture of waste water and treating agent should be combusted immediately after completion of the mixing, since when cyanides such as sodium cyanide and/or other metal cyanides which are contained in the waste water are mixed with a carbonyl compound such as formaldehyde, formaldehydecyanohydrin which is a toxic substance is readily formed and is vaporized because of the heat of reaction between the cyanide and formaldehyde, and it is possible that the formaldehydecyanohydrin will be polymerized. Accordingly, for the sake of safety, it is undesirable to allow the mixture to stand for any extended period of time. It is unfavorable to feed the cyanide-containing waste water and the carbonyl compound-containing agent separately for mixing within the incinerator, since the carbonyl compound will tend to be burnt without taking part in reaction with the cyanides.

The carbonyl compound or compounds are added to the waste water in an amount sufficient to convert the total cyano component contained therein into, for example, formaldehydecyanohydrin, and particularly within the range of 1.0–5.0 times the theoretical amount $(CH_2O/CN = 1.0 : 1.0 \text{ mol})$. In this connection, where formaldehyde is used as the carbonyl compound, even an amount of 1.0–1.3 times the theorectical amount is sufficient to achieve satisfactory results. Moreover, even if a carbonyl compound is charged into the waste water in an amount less than 1.0 time the theoretical amount of total cyano component contained in the liquor, addition of the carbonyl compound still shows a significant operational effect, i.e., the incinerated residue can be imparted with properties which allow easy handling by adding the carbonyl compound in an amount of 0.2–0.5 times the theoretical amount of the total cyano component.

As is apparent from the foregoing, cyanides which are contained in the cyanide-containing waste water can be converted into formaldehyde-cyanohydrin by adding formaldehyde thereto. In other words, inoganic cyanides can be converted into organic cyanides which are capable of easy combustion or decomposition. The waste water containing the carbonyl compound may be combusted by any known combustion method, including a method wherein the liquor is directly contacted with fuel gas flames such as of a heavy oil, kerosene, city gas or propane gas.

As a result of studies of incinerators for carrying out methods of treating cyanide-containing waste water, it has been found that known incinerators are not suitable for carrying out the method of the present invention. The apparatus of the present invention is specifically constructed for putting into effect the method of the present invention in an efficient manner for combusting a mixture of waste water and a carbonyl compound with a substantial increase in treating capacity of the waste water.

There have been known combustion methods and apparatus wherein a relatively high water content waste oil such as an aqueous grinding oil or an aqueous detergent is sprayed for combustion purposes. However, if the known methods and apparatus are applied to achieve the objects of the present invention, various cyanides of metals contained in the cyanide-containing waste water are often precipitated in the liquor and when the treating agent which contains, for example, formaldehyde is added to the waste water, a large amount of hydroxides of the metals are also precipatated to form a slurry so that it becomes difficult to uniformly spray the resultant waste water, with frequent choking of the spraying means. the cyanide-containing waste liquor contains therein a relatively large amount of various kinds of metal oxides. If these oxide residues are incompletely treated, there is produced a residue which contains undesirably large amounts of non-decomposed cyanides. Furthermore, though the cyanide-containing waste water contains a relatively high concentration of cyanides, a major portion of the waste water consists substantially of water, so that it is required to pay careful attention when transferring a slurry for decomposition of cyanides contained in the waste water and for condensation of the waste water by removing water therefrom.

In the method of the present invention, the cyanides are substantially completely combusted and the apparatus of the present invention is constructed in such a manner as to overcome the above-mentioned difficulties of the prior art apparatus and to assure complete combustion of the cyanides by the use of a fluidized residue which is produced during condensation and combustion.

As described hereinbefore, a preferred form of apparatus embodying the present invention comprises an incinerator comprising a burner provided on an inner wall surface thereof and having an injection means, nozzle, e.g., for injecting a combustion gas substantially horizontlly into the incinerator, a waste water inlet positioned above the gas-injecting level of said burner, an upper plate positioned below said waste water inlet and above said gas-injecting level and inclined to allow the waste water to flow downward toward the gas-injecting level, and a lower plate positioned below the gas-injecting level and either inclined at an angle thereto to positively impart a downward flow to the waste water or held in a horizontal position without inclination, if desired, the lower plate being held in contact with the inner wall surfaces of the incinerator except for the wall surface on the side at which the burner is provided, and a dust collector for the combusted exhaust gases communicating with the incinerator through a flue positioned above the injection means in the burner.

Where the above apparatus is used for combusting a cyanide-containing waste water which contains even several ten thousands ppm. of cyano component or group, the exhaust gases from the apparatus is substantially free of cyano component and the metal-containing residue remains in the incinerator. Additionally, the residue may be utilized as special metal-reproduction materials.

As shown in the drawing, the incinerator or combustion apparatus generally 10 of the present invention comprises a burner 12 having an injection nozzle 14 for injecting a combustion gas generally horizontally into incinerator 10, a waste water inlet 16 above nozzle 14, an upper plate 18 below waste water inlet 16 and above nozzle 14 which is inclined at an angle with respect to the horizontal so as to impart flow movement to the cyanide-containing waste water toward the gas-injecting level of the burner, and a lower plate 20 which may also be inclined in such a manner that the waste water on plate 20 is flowed in a direction opposite to the gas flame-injecting direction, the waste water thus being preheated, condensed and dried and the cyanides being decomposed and completely combusted on the upper and lower plates 18 and 20.

It will be appreciated that when upper plate 18 functions in a satisfactory manner, the angle of inclination of lower plate 20 may be reduced as long as flow of waste water in the direction opposite to the gas flame-injecting direction is ensured and lower plate 20 may be provided in the form of a horizontally disposed box as seen in FIG. 4.

In operation, the cyanide-containing waste water is distributed widthwise of upper plate 18 by means of distributing plate 22 which is provided at the top portion of upper plate 18. The waste water overflowing distributing plate 4 is flowed down on to upper plate 18 where the liquor is condensed by evaporation and substantially dried and a portion of the cyanides is decomposed. The resultant dried and thickened waste is dropped from the end portion of upper plate 18 down to lower plate 20, and is flowed on the surface of the lower plate in a counterflow with respect to the gas flames propagating from burner 12. At this time, the fluidized slurry is turned into a uniform semi-molten thin layer as thick as several milimeters. The layer is directly contacted with high temperature portions of the burner flames to completely decompose any remaining non-decomposed cyanides. The residue exhausted in this manner does not contain any significant amount of cyanides. Even though the cyanides are first decomposed into toxic hydrogen cyanide or other noxious gases, such toxic gases are directly combusted by means of the gas flames to render them harmless.

The apparatus of the present invention will be described more particularly with reference to the drawing and first to FIG. 1 wherein there is shown a combusting apparatus comprising an incinerator 10 provided with burner 12, nozzle 14, waste water inlet 16, upper plate 18 having distributor plate 22 for distributing the waste water, lower plate 20 at least one portion of which is inclined so as to impart flow to the waste water and the upper surface of which faces the injected gas flames, heating means 24 and 24' and dust collector 26 which is connected with incinerator 10 through flue 28. Dust collector 26 comprises stack 30, water sprinklers 32, wires 34, screen 36 and water-withdrawing tube 37 for removing dust, as clearly shown in FIG. 1. FIG. 2 shows in the top view the upper plate 18 wherein door 38 of a heat resistant material of incinerator 10 and burner 12 mounted in door 38 are shown. Upper plate 18 may be provided in the form shown in perspective in FIG. 3, including waste water distributing portion 40 and dash board 42.

The above-described apparatus is shown only by way of explanation and various variations and modifications may be made within the scope of the present invention. That is, in FIG. 1, although incinerator 10 is shown in the form of a box, it may be of cylindrical form. Heating means 24 is hermetically sealed and may be mounted within the flue 28. Moreover, evaporated water, decomposed cyano component and other gases may be introduced into the space between the lower end of upper plate 18 and the upper end of lower plate 20 facing the gas flames to completely combust the combustible gases, and then brought into contact with heating body 24. The resultant exhaust gases are released from flue 28. It will be noted that heating means 24 and 24' described herein include those of iron, stainless steel, nickel-chrome steel, cast iron or other metals, ceramic products mainly composed of silica and/or alumina, birck or the like.

Furthermore, both sides of upper plate 18 are not necessarily required to be held in contact with the inner surfaces of incinerator 10. The angles of inclination of upper plate 18 and lower plate 20 will be described since the inclinations of the plates are important for maintaining flow movement of the waste water through the apparatus. the cyanide-containing waste water with the treating agent containing, for example, formaldehyde is fed to waste water distributing portion 40 positioned at the top of the upper plate 18. The waste water has a relatively low viscosity and is treated in a high temperature atmosphere so that even if the waste water is substantially dried, it retains suitable fluidity. Accordingly, it is unnecessary to incline upper plate 18 at a great angle, and it is generally sufficient to employ an inclination angle as small as about 10° from the horizontal for the upper plate. On the other hand, the inclination angle of lower plate 20 should be such that the fluidized material is formed into a semi-molten uniform thin layer having a thickness of about several millimeters. The inclination angle may be varied depending upon the kinds or compositions of metal compounds contained in the waste water to be treated, but is generally within the range of 0°–30°, preferably 5°–20° from the horizontal. The length of the inclined portion of lower plate 20 is suitably determined by taking into consideration the above-mentioned various conditions. In this connection, even if the inclination angle is zero as shown in FIG. 4, the function of the lower plate 20 is not impaired to a material degree. In FIG. 4, door 38 is positioned in the wall opposite that carrying burner 12.

Distributing plate 40 and dash board 42 are provided for effectively utilizing the heat capacity of burner 12 and their shapes can be determined case by case. Dust collector 26 may be any of the known types but should function to remove finely powdered materials such as zinc oxide which are contained in the combusted residue of the waste water. The combusted residue formed by the combustion treatment at lower plate 20 may be either discharged into a reservoir (not shown) or withdrawn from the apparatus by a suitable means.

The above-described combusting apparatus is effective not only for separately treating cyanide-containing waste waters in individual metal surface treating and metal refining plants, but also for collectively treating waste waters which are gathered from various cyanide-exhausting plants. In this connection, the size of the combusting apparatus should be determined depending upon the amount of waste water to be treated.

As is apparent from the foregoing, the method of the present invention comprises directly combusting the cyanide-containing waste water containing a carbonyl compound as treating agent. Accordingly, the method of the present invention does not require the steps of dehydrating and drying metal sludges which contain 80%–100% or more by weight of water based upon the metals contained, which would present a serious problem as in the prior art alkali chloride method. According to the present invention, the metals are taken out in the form of a dried solids residue and allow easy recovery thereof. In this manner, not only cyanides but also heavy metals can be suitably treated in the method of the present invention, so that environmental pollution of rivers and seas can be well prevented.

The present invention will be particularly illustrated in the following examples. Following are brief descriptions of analytical methods and instruments which were employed in the examples.

Japanese Industrial Standard K-0102-Method for Testing Waste Liquor Exhausted From Metal Treating Plants:

A cyano component ($CN^-$) is contained in waste water in the form of a cyano ion (including HCN) and/or a cyano complex ion. In order to determine the amount of $CN^-$ as total cyano component, a sample of the waste water is mixed with phosphoric acid to adjust the pH value to less than 2. The mixture is heated and distilled to generate all cyano components in the form of hydrogen cyanide. The thus generated cyanide is collected in a sodium hydroxide solution. The resultant solution is subjected to determination of the cyano component in accordance with the pyridine-pyrazolone method (a calorimetric determination), the mercuricthiocyanate method (a calorimetric determination) and/or with silver nitrate (titration). These methods are properly used depending upon the cyano content in the collected solution.

Japanese Industrial Standards K-0109-Method for Analyzing Hydrogen Cyanide Contained in Exhaust Gases:

Exhaust gases in a flue are removed therefrom by means of a closed type suction pump and passed through a 2% NaOH aqueous solution to collect hydrogen cyanide gas. The collected hydrogen cyanide gas is determined by a pryridine-pyrazolone calorimetric determination method, a silver nitrate titration method, etc. as described above. The content of hydrogen cyanide in the exhaust gases is calculated in consideration of various factors such as the total amount of exhaust gas, temperatures, pressures, etc., which are read out by means of a gas meter during the collection.

Kitagawa's Detecting Tube

This detecting tube is used for detecting formaldehyde which is contained in an exhaust gas and comprises a sampling pump of the vacuum type and a detecting tube. The exhaust gas is drawn through the tube and the concentration of formaldehyde (ppm) is determined by consulting the table concerned.

Commerically Available HS Type Furnace

This is a combusting furnace provided with iron lattices and a kerosene burner. The consumption of kerosene is 2.4 liters/hr. and amount of air blasted is 10 liters/sec.

Comparative Examples

Reagent grade potassium ferricyanide was dissolved in 200 ml. of pure water to prepare a potassium ferricyanide aqueous solution which contained 5,000 ppm. of total cyano component. The thus prepared potassium ferricyanide aqueous solution was transferred to a commerically available enameled vat of cabinet size, which was then placed within a commerically available HS type incinerator for subjecting the solution to a heat and decomposition treatment for about 35 minutes. After completion of the burning and decomposition, a portion of the produced ash was sampled and the total cyano content thereof was determined according to the method prescribed in the aforementioned JIS K-0102. It was found that 95.0% of the cyano component was decomposed. The ash was recovered in a substantially absolute dry state and was not freely scattered. Although the resultant combusted gases were passed through a Kitagawa's detecting tube at intervals of 5 minutes, no hydrogen cyanide was detected.

In this example, the average temperature within the incinerator was 350° C., and a content of oxygen in the exhaust gases was within the range of 2–5% by volume.

The above experiment was repeated except that the average temperature within the incinerator was 250° C. The decomposition rate was 85%. The above experiment was again repeated except that the content of oxygen in the exhaust gases became as low as 1% by adjusting the amount of air blast. As a result, the decomposition rate of total cyano component was 80% and the hydrogen cyanide content in the exhaust gases reached 5.0 ppm. Additionally, a remarkable amount of soot was produced and the exhaust gases emitted an intense kerosene odor.

EXAMPLE 1

Varios kinds of cyano-base plating waste waters from a plating plant were gathered and mixed together. 4.1 Liters of the mixed waste water (which contained 15,862 ppm. of total cyano component together with Zn, Cu, and Fe, and which had a specific gravity of 1.2, a pH value of 13.4 and a liquid temperature of 25° C.) and 0.5 liters of commerically available formalin (containing 37.2% by weight of HCHO) were fed to an incinerator of the commerically avialable HS type by mixing together within the feeding tube by use of a glass Y-tube. The charge rate each of the waste water and formalin was regulated by passing it through a know rotor meter, i.e., the charging rate of the waste water was 50 ml./min., and that of formalin 6 ml./min. An enameled vat of the cabinet type was placed in the incinerator and feeding of the mixture was commenced after a kerosene burner was ignited for conducting burning and decomposition treatments for about 100 minutes. A part of heat generated was used for heat-exchange to obtain warm water.

After completion of the above treatments, a part of the furnace residue produced was sampled and subjected to determination of total cyano component by the method prescribed in JIS K-0102, thereby to detect 4.0 ppm. of cyano component (decomposition rate of 99.98%). Although the residue was allowed to stand in air for 10 days, it showed neither hydroscopticity nor fugacity. 1.83.7 Liters of the exhaust gases generated were passed into a 10% sodium hydroxide aqueous solution by use of a gas-absorbing apparatus as shown in JIS K-0109 for determining the content of hydrogen cyanide in the exhaust gases by the method prescribed in JIS K-0109. The content of hydrogen cyanide was less than 1.0 ppm. Furthermore, formaldehyde contained in exhaust gas was determined by the use of Kitagawa's detecting tube. No hydrogen cyanide was detected.

For comparative purposes, the above process was repeated without using formalin. The decomposition rate was 56% and hydrogen cyanide was contained in the exhaust gases in the amount of 7.0 ppm.

EXAMPLE 2

300 Grams of sodium cyanide (having a purity of 95%) and 150 grams of sodium hydroxide (having a purity of 95%) were dissolved in 3 liters of water to prepare a solution containing 50,100 ppm. of total cyano component. Then, 500 ml. of formalin (containing 37.2% by weight formaldehyde) was further added to the solution and 3.5 liters of the resultant solution was subjected to burning and decomposition treatments in the same manner as in Example 1 except that charge of the solution was 80 ml./min. and the treatment was conducted over about 80 minutes. After completion of the treatments, the content of the total cyano component contained in the ash, and of hydrogen cyanide and formaldehyde in the exhaust gases were determined. The content of total cyano component was zero, hydrogen cyanide was contained in the gases in an amount of 1.2 ppm., no formaldehyde was detected and the decomposition rate was greater than 99.9%.

For comparative purposes, the above process was repeated without using formalin. As a result, the decomposition rate was 76% and hydrogen cyanide in the exhaust gas was contained in an amount of 5.2 ppm.

EXAMPLE 3

350 Grams of sodium cyanide, 250 grams of sodium hydroxide and 120 grams of sodium carbonate (having a purity of 95%) were dissolved in 4.5 liters of water for preparing about 5 liters of solution which contained 35,380 ppm. of total cyano component. 110 Grams of the resultant solution was transferred to a procelain evaporating dish having a diameter of 11 cm., to which was added 9.0 grams of acetone (having a purity of 95%) and the mixture was agitated for 5 minutes. Then, the sample-containing porcelain dish was placed on a triangle for burning the sample by means of a bunzen burner using city gas for 25 minutes. The burnt sample was allowed to stand and the content of the total cyano component in the burnt residue was determined by the method prescribed in JIS K-0102. The decomposition rate of the cyanide reached 64.2%.

For comparison, when the above-process was repeated without addition of acetone, the decomposition rate was 55.7%.

EXAMPLE 4

109 Grams of the solution prepared in Example 3 was mixed with 8.5 grams of an 80% acetoaldehyde aqueous solution, and then the mixture was treated in the same manner as in Example 3. As a result, the decomposition rate was 93.5%.

EXAMPLE 5

The solution prepared in Example 3 was mixed with each of the carbonyl compounds as shown in the following table and the resultant mixtures were respectively treated in the same manner as in Example 3. The test results are also shown in the table.

| Amount of Solution (g) | Carbonyl Compounds | (g) | Decomposition Rate (%) |
|---|---|---|---|
| 110 | Methyl ethyl ketone | 11.2 | 58.4 |
| 109 | Cyclohexanone | 15.2 | 65.5 |
| 110 | Acetophenone | 18.6 | 77.2 |
| 110 | Urea | 9.3 | 86.2 |

EXAMPLE 6

109 Grams of the solution prepared in Example 3 was mixed with 10 grams of commercially available sugar and the resultant mixture was treated in the same manner as in Example 3 to obtain an 88.5% decomposition rate.

EXAMPLE 7

In order to treat a darkish violet opaque organic dye-containing waste water (which contained 33,900 ppm. of NaCN, heavy metals such as Fe, 25,000 ppm. of chemical oxygen demand, and which had a pH value of 11 and a liquid temperature of 20° C.) exhausted from a dyeing plant, the combusting apparatus of the present invention was constructed in accordance with FIGS. 1-3, the apparatus comprising an incinerator (having a size of 400 × 400 × 600 mm.), an upper plate (having a size of 400 × 600 mm. and a dash board with a height of 10 mm.), and an L-type lower plate (having a size of 400 × 600 mm.), the upper and lower plates each having an inclination angle of 10° from the horizontal and each part being made of iron plates having a thickness of 1.6 mm. A dust collector of the water-sprinkling type which had the shape of a box having a size of 400 × 400 × 600 mm. was connected with the upper portion of the incinerator. The incinerator was made heat-resistant with calcium silicate plates (having a thickness of 20 mm.).

The above-described waste water was fed at a rate of 200 g./min. and mixed through a Y-tube with a 37% formalin aqueous solution fed at a rate of 20 ml./min. The mixture was introduced into the incinerator through a feeding tube and 6.0 kg. of the mixture was combusted over 30 min. by means of a commercially available kerosene burner. The waste water was preheated and condensed on the upper plate and dropped onto the lower plate, where the waste water was dried and incinerated. In addition, hydrogen cyanide and other generated gases were combusted. After completion of the combustion, a part of the ash produced was sampled and subjected to determination of total cyano component by the method prescribed in JIS K-0102. The test revealed that 99% of the total cyano component which existed prior to decomposition was decomposed. The ash was recovered in an extremely dried state and showed no fugacity.

On the other hand, 180 liters of the exhaust gases generated was subjected to a test wherein hydrogen cyanide was determined by use of a gas-absorbing apparatus as shown in JIS K-0109 by the method as prescribed in JIS K-0109. The test revealed that the content of hydrogen cyanide was 0.7 ppm. In this process, 300 grams of ashes were recovered, so that the waste water was almost completely treated.

The temperatures in each part of the combusting apparatus and contents of oxygen gas in the exhaust gases were as follows:

| | |
|---|---|
| Temperatures of the exhaust gases (within the chimney stack) | 120° – 240° C. |
| Oxygen content of the exhaust gases | 2 – 5% (vol.) |
| Temperatures in the flue | 440° – 705° C. |
| Temperatures above the lower plate and in the vicinity of the burner | 540° – 900° C. |
| Temperatures of the deepest portion of the lower plate | 350° – 730° C. |
| Temperatures of exhaust gas-wash water (inlet) | 6° – 7° C. |
| (outlet) | 32° – 43° C. |
| Atmospheric temperatures | 11° – 14.5° C. |

EXAMPLE 8

7.7 Kg. of a zinc cyanide-plating waste water (which contained 8,320 ppm. of total cyano component, 1,978 mg./l. of Fe and which had a specific gravity of 1.1, a pH value of 14 and a liquid temperature of 22° C.) was exhausted from a plating plant was mixed with a 37% formalin aqueous solution at flow rates of 192 g./min. and 20 ml./min. respectively. The mixture was treated for 40 minutes in the combusting apparatus of Example 7. After completion of the treatment, the decomposition rate of the total cyano component and the content of hydrogen cyanide in the exhaust gases were determined in the same manner as in Example 7. The decomposition rate was 99.9% and 0.06 ppm. of hydrogen cyanide was detected.

What is claimed is:

1. A method for treating a cyanide-containing waste water which comprises mixing said waste water with formaldehyde in an amount of from 1.0 to 1.3 mols per mol of cyano component contained in said waste water, and immediately subjecting said mixture to treatment at a temperature of from 300° to 1200° C. in an atmosphere containing oxygen in an amount sufficient to provide an oxygen content in the exhaust gases within the range of from 2 to 11% by volume to evaporate water and volatile materials from the mixture and decompose the cyanide-containing components thereof and to burn said decomposed cyanide components and other combustible materials whereby the cyano component contained in the exhausted gases is substantially reduced, the metals contained in the original cyanide-containing waste water are recovered as solids and no toxic components are released into the atmosphere or discarded as waste.

2. The method according to claim 1 wherein the temperature range is from 300° to 800° C. and the oxygen content in the exhaust gases is from 2 to 5% by volume.

* * * * *